United States Patent

Harris et al.

[15] 3,652,012

[45] Mar. 28, 1972

[54] VOTE RECORDING CONSTRUCTION

[72] Inventors: Joseph P. Harris, 1020 Lassen Street, Berkeley, Calif. 94707; Leonard N. Albrecht, 1920 Paradise Drive, Tiburon, Calif. 94920

[22] Filed: July 9, 1970

[21] Appl. No.: 53,506

[52] U.S. Cl. ....... 235/50

[51] Int. Cl. ....... G07c 13/00

[58] Field of Search ....... 235/51, 50, 54; 225/93; 52/36, 52/63; 248/361 TF; 312/208

[56] References Cited

UNITED STATES PATENTS

| | | | |
|---|---|---|---|
| 952,464 | 3/1910 | McTammany | 235/55 |
| 3,240,409 | 3/1966 | Harris | 235/50 |
| 2,655,072 | 10/1953 | Poupitch | 248/361 TF |
| 1,487,493 | 3/1924 | Tolman | 235/51 X |
| 994,763 | 6/1911 | Loe | 235/54 |
| 1,065,703 | 6/1913 | McTammany | 235/55 |
| 1,108,384 | 8/1914 | McTammany | 235/54 |
| 3,201,038 | 8/1965 | Harris | 235/50 |

*Primary Examiner*—Richard B. Wilkinson
*Assistant Examiner*—Stanley A. Wal
*Attorney*—Gordon Wood

[57] ABSTRACT

A voting booth construction which provides a simplified and efficient means of combining a voting booth and vote recorder to provide a facility used by voters to record votes manually on a machine processable card. A vote recorder and a support therefor are provided with interengaging elements to position and secure said recorder on said support in the desired voting position. The vote recorder is designed so that a plurality of said recorders may be installed in the limited space of a voting booth, the reference pages of each recorder being adapted to overlap the reference pages of an adjoining recorder. The interengaging elements on the vote recorder and its support are so arranged as to permit one or more recorders to be attached to the support in various predetermined positions to enhance the efficiency of the voting operation. The preferred form of the invention includes a plurality of projections on the vote recorder and a sufficient number of apertures on the support to permit installation of the vote recorder in different positions depending upon the requirements of the election and to provide for the convenience of voters.

4 Claims, 5 Drawing Figures

INVENTOR.
JOSEPH P. HARRIS
LEONARD N. ALBRECHT
BY
Gordon Wood.

VOTE RECORDING CONSTRUCTION

This invention relates to data recording and more particularly to data recording devices employed for voting. The invention is specifically directed to the type of vote recorder shown in U.S. Pat. No. 3,240,409.

The device disclosed in the above patent essentially comprises a housing in which is detachably secured a base which includes means permitting a machine processable record card to be punched by the user with reference to a plurality of leaves which are supported on the base for swinging about parallel axes. As can be seen in U.S. Pat. No. 3,240,409 the swingable leaves when in use may overhang one or the other of the side edges of the base that are parallel to the axes of swing of the leaves. However, the housing of the referenced patent is of sufficient extent so that such overhanging leaves nevertheless are supported by the housing and are at all times within the confines of such housing. Heretofore the housing, generally designated 1 in the referenced patent, has usually been in the order of 18 inches wide in order to perform its function of holding the punching mechanism in a stable position and confining and supporting the leaves within the area of the housing. In some elections the number of candidates and issues to be voted on exceed the maximum number of usable voting positions on the vote recorder, and hence it becomes necessary to use paper ballots to supplement the ballot on the vote recorder, adding to the expense of the election and the burden on the voter. The ideal solution of this problem is to provide for the installation of two or more vote recorders in each voting booth, thus providing the capacity required.

The main object of the present invention is the provision of a voting booth and vote recorder construction which permits the use of a plurality of vote recorders within one voting booth without eliminating the benefits accruing from the use of the type of vote recording device disclosed in U.S. Pat. No. 3,240,409.

A second object of the invention is to provide means whereby vote recorders may be positioned and secured to a support in a voting booth in the correct voting position, which is important to the accurate recording of votes. Without such means the vote recorders may be accidentally moved or accidentally knocked off the voting table. If paper ballots are used in addition to the vote recorders, space should be provided for marking them. This invention provides for the securing of the vote recorders and the sealing of the same if desired, in a position which provides for optimum accuracy in recording votes and greatest convenience to the voters.

Another object of the invention is to provide a compact, light weight vote recorder which may be stored in a relatively small space, making it readily accessible for inspection and preparation for elections and economically transported to the polling places.

Within one particular precinct numerous types of elections may be had. In some instances an extremely short ballot is involved in which case an old style paper ballot may be desirable and no vote recorder of the type shown in the above noted patent is required. A primary election in the same precinct however may have so many issues involved that one vote recorder or even two are not sufficient to provide the means for the voter to register his selections. In such a case the construction of the voting booth and the vote recorder should be such that the voting area defined by the support for the vote recorder should be adaptable for use with one, two, or even three vote recorders without causing discomfort to the voter in making his selections.

Other objects and advantages will be apparent from the following specification and from the drawing.

Figure 1:
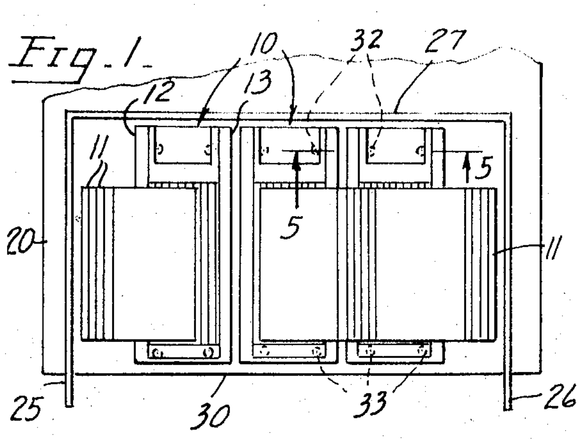
FIG. 1 is a fragmentary top plan view of a voting booth support on which a voting area is defined and on which three vote recorders are positioned.
Figure 2:
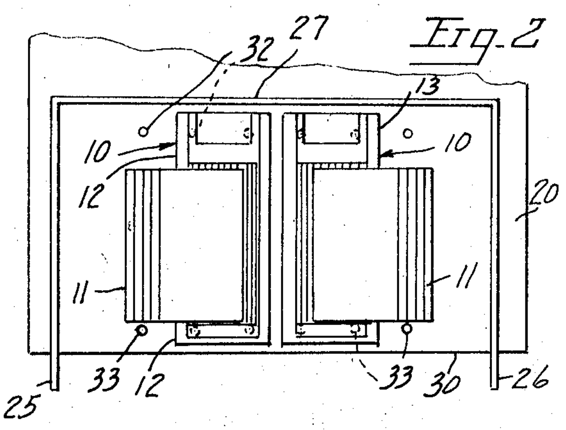
FIG. 2 is a view similar to FIG. 1 but showing only two vote recorders on the same support.
Figure 3:
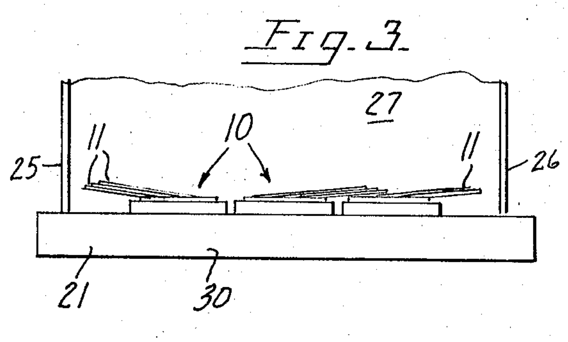
FIGS. 3, 4 are front elevations of the structures of FIGS. 1, 2 respectively.
Figure 4:
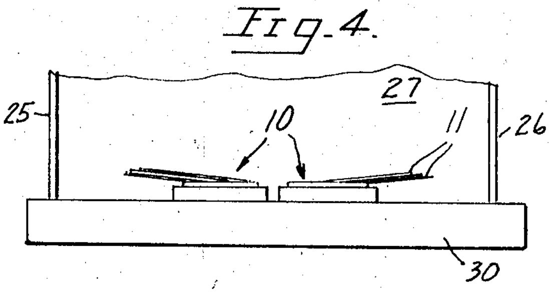

The base of the data registering device disclosed in U.S. Pat. No. 3,240,409 supports the machine processable record card and also the swingably supported leaves on which is carried the printed matter from which the voter registers his selections by punching the card that is supported on the base. Details of construction of said base are not included herein but in the drawing there are indicated housings 10 in each of which a base 2 of U.S. Pat. No. 3,240,409 is supported. The particular construction of the housings 10 is not significant with respect to the present invention except that they are sufficiently narrow so that the leaves 11 which are swingably mounted in the housings 10 overhang the longitudinally extending sides of their housings that are parallel to the axes of swing of such leaves. Thus with reference to FIGS. 1–4 it is seen that the leaves 11 may overhang one or the other of the sides 12, 13. It will be apparent that such overhanging of the leaves permits the mounting of a plurality of vote recording devices in a limited space but does not impair the user's manipulation of the leaves.

In the drawing the support for the vote recorders may simply be a table top 20 provided with a flange 21 therearound and supported by suitable legs (not shown). A voting area on said table top may be defined by a pair of side walls 25, 26 and an inner wall 27; said walls extending vertically upwardly from the horizontally extending data recorder support 20. The voter of course stands alongside the side 30 of the support 20 and between the walls 25, 26 when making his selections. The space between the side walls 25, 26 may vary between 24 inches and 32 inches depending upon the particular jurisdiction.

Figure 5:
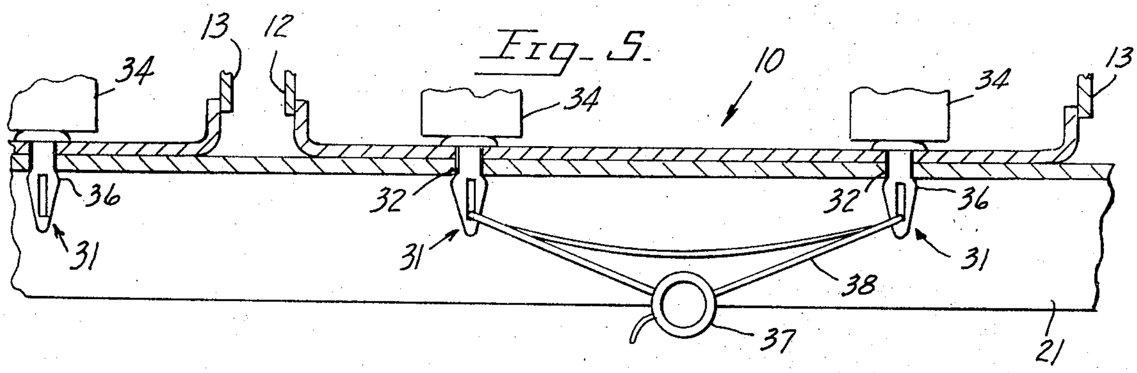
FIG. 5 is a greatly enlarged transverse sectional view through the vote recorder support showing two vote recorders with a means for releasably securing the same to the support.

By the present invention each housing 10 is provided with preferably four downwardly extending projections 31 (FIG. 5) which are fixedly secured at their inner ends to the housing 10 by abutments 34. The horizontally extending support 20 is provided with two rows of apertures; the apertures in the inner row being designated 32 and the apertures in the outer row 33. In the particular embodiment of the invention shown in FIGS. 1 and 2 there are six equally spaced apart holes in each row so that any one vote recorder may be positioned in five different positions across the width of the voting area. In view of the fact that the width of each housing is predetermined by the width of the machine processable record card it is not practical to attempt to accommodate more than three vote recorders in the areas generally fixed for the voting operation. However it will be apparent from FIGS. 1, 2 that if one vote recorder is employed it may be centrally positioned relative to the voting area or may be positioned on the left-hand side thereof if a paper ballot is also to be employed in connection with the election. Furthermore it will be apparent that one, two, or three vote recorders may readily be fixedly secured in place depending upon the requirements of the election.

The projections 31 are preferably of the type which include an enlarged resilient portion 36 which must be compressed slightly to permit it to pass through its associated aperture so that the devices may be secured in place simply by pressing downwardly on the same with a moderate force when the projections 31 are registered with the holes 32 and 33.

In order to ensure the safety of the vote recorders a conventional seal 37 including a wire 38 may be passed through apertures in projections 31 and sealed as indicated to prevent removal of the devices from the support 20.

I claim:

1. In a vote recording construction:

a horizontally extending table top of a height and horizontal extent suitable for writing on by a standing person, a generally horizontally extending vote recorder housing on said top including recording means adapted to be manipulated by such person, interengaging elements on said top and said housing for releasably securing said housing to said top;

including a plurality of apertures in said top and a plurality of projections on said housing wherein the number and location of said apertures permits the securement of a plurality of housings to said top.

2. Construction according to claim 1 wherein the reference pages of one vote recorder overlap the reference pages of an adjoining vote recorder.

3. Construction according to claim 1 wherein said apertures are arranged in two rows and are equally spaced apart in each row.

4. Construction according to claim 1 wherein said vote recorder includes manually swingable leaves adapted to overhang one side of said housing that is parallel to the axes of swing of said leaves and said interengaging element comprise a pair of projections on the under side of said housing and a row of at least three apertures in said top with said apertures being spaced apart a distance equal to the spacing of said projections whereby said housing may be secured to said top with a pair of projections extending through a pair of apertures and in any one of a plurality of positions equal to one less than the number of said apertures.

* * * * *